United States Patent
Keizer et al.

(10) Patent No.: US 9,341,058 B2
(45) Date of Patent: May 17, 2016

(54) MONITORING PRODUCED WATER

(71) Applicant: Ecolab USA Inc., Naperville, IL (US)

(72) Inventors: Timothy S. Keizer, Aurora, IL (US); Jason R. Burney, Aurora, IL (US)

(73) Assignee: ECOLAB USA Inc., Naperville, IL (US)

( * ) Notice: Subject to any disclaimer, the term of this patent is extended or adjusted under 35 U.S.C. 154(b) by 547 days.

(21) Appl. No.: 13/804,950

(22) Filed: Mar. 14, 2013

(65) Prior Publication Data

US 2014/0262233 A1  Sep. 18, 2014

(51) Int. Cl.
*E21B 49/10* (2006.01)
*E21B 47/12* (2012.01)
*E21B 47/10* (2012.01)

(52) U.S. Cl.
CPC ............ *E21B 47/12* (2013.01); *E21B 47/10* (2013.01)

(58) Field of Classification Search
CPC ..................................................... E21B 49/00
USPC ......... 73/152.18; 166/250.01, 66; 210/1, 632, 210/739, 743, 745, 746
See application file for complete search history.

(56) References Cited

U.S. PATENT DOCUMENTS

| | | | |
|---|---|---|---|
| 5,066,199 A | 11/1991 | Reese et al. | |
| 5,195,879 A | 3/1993 | Reese et al. | |
| 5,302,253 A | 4/1994 | Lessard et al. | |
| 5,324,665 A | 6/1994 | Lessard et al. | |
| 5,326,482 A | 7/1994 | Lessard et al. | |
| 6,491,828 B1 * | 12/2002 | Sivavec et al. | 210/739 |
| 6,685,840 B2 | 2/2004 | Hatch | |
| 6,845,336 B2 * | 1/2005 | Kodukula et al. | 702/118 |
| 7,320,749 B2 | 1/2008 | Speece et al. | |
| 7,955,853 B2 | 6/2011 | Hicks et al. | |
| 8,068,033 B2 | 11/2011 | Blokker et al. | |
| 8,130,106 B1 * | 3/2012 | Hicks et al. | 340/603 |
| 8,958,917 B2 * | 2/2015 | Wolfe et al. | 700/266 |
| 2005/0103717 A1 * | 5/2005 | Jha et al. | 210/652 |
| 2009/0242197 A1 * | 10/2009 | Hackworth et al. | 166/250.01 |
| 2010/0059226 A1 | 3/2010 | Termine et al. | |
| 2010/0108566 A1 * | 5/2010 | Scattergood et al. | 208/47 |
| 2011/0024361 A1 * | 2/2011 | Schwartzel et al. | 210/739 |
| 2011/0030951 A1 * | 2/2011 | Irvine et al. | 166/278 |
| 2011/0137465 A1 * | 6/2011 | Angelilli et al. | 700/271 |
| 2012/0234756 A1 | 9/2012 | Hicks et al. | |
| 2014/0186210 A1 * | 7/2014 | Gill | 422/3 |
| 2014/0277746 A1 * | 9/2014 | Konishi et al. | 700/265 |

OTHER PUBLICATIONS

International Search Report and Written Opinion dated Aug. 6, 2014 for PCT/US2014/022211.

* cited by examiner

*Primary Examiner* — Hezron E Williams
*Assistant Examiner* — Hoang Nguyen
(74) *Attorney, Agent, or Firm* — Eric D. Babych; Brinks Gilson & Lione

(57) ABSTRACT

This disclosure relates to systems, methods, and devices useful for monitoring and controlling water that has been used in, for example, oil and natural gas production, recovery, or hydraulic fracturing processes. An on-line unit for measuring, controlling, and optimizing the quality of produced water after being used in a hydrocarbon production or hydraulic fracturing process is also disclosed. Optimizing and controlling can include measuring one or more properties associated with the produced water to be sure that the one or more properties are within an acceptable range and, if the one or more properties are not within the acceptable range for each respective property being measured, causing a change in flow of one or more fresh water sources and/or one or more chemicals into the produced water.

20 Claims, 1 Drawing Sheet

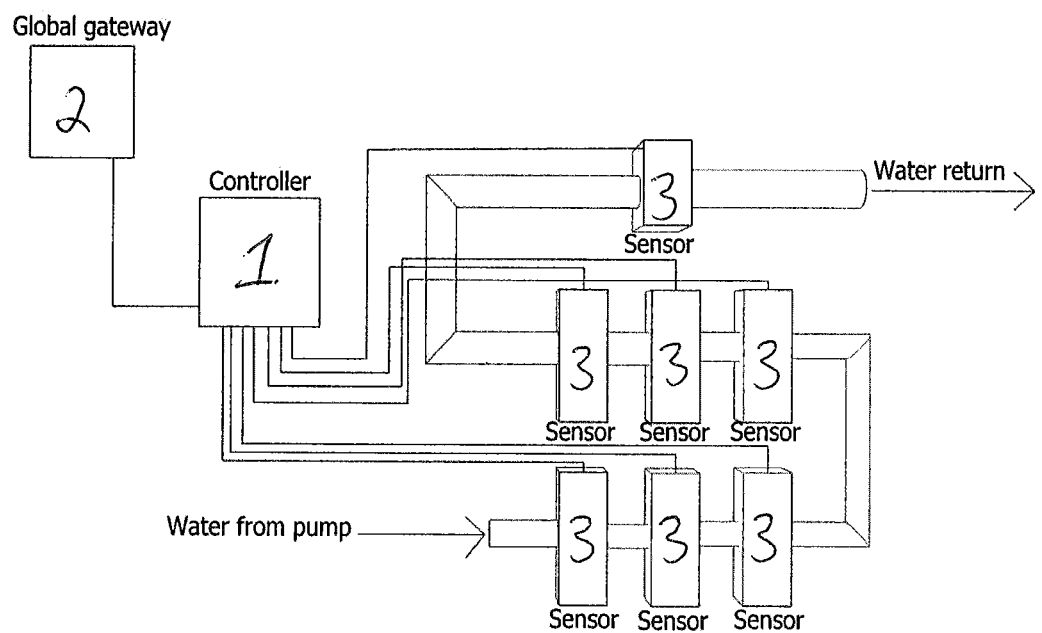

MONITORING PRODUCED WATER

CROSS-REFERENCE TO RELATED APPLICATIONS

Not Applicable

FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING COMPACT DISC APPENDIX

Not Applicable

BACKGROUND OF THE INVENTION

1. Field of the Invention

This disclosure relates generally to systems, methods, and devices useful for monitoring produced waters coming from, for example, hydrocarbon production processes. More specifically, the disclosure relates to an on-line unit for measuring and optimizing the quality of water after its use in hydrocarbon recovery or production processes, such as a hydraulic fracturing process.

2. Description of the Related Art

Oil and natural gas from shale formations play important roles in meeting the energy demands of the United States. Development of tight oil in the past few years has allowed domestic production of crude oil to increase from 5.1 million barrels a day in 2007 to 5.5 million barrels a day in 2010, reversing a decline in production that began in 1986. Continued development of tight oil will enable the US to produce 6.7 million barrels a day by 2020. Shale gas production is expected to increase from 5 trillion cubic feet in 2010 (23% of total US gas production) to 13.6 trillion cubic feet in 2035 (49% of total US gas production). To enable this large growth in oil and gas supply, numerous new wells will need to be drilled and stimulated via hydraulic fracturing.

Hydraulic fracturing involves pumping a water-sand-chemical mixture into a well at high pressure to fracture the shale formation surrounding the well and allow the natural gas to flow to the wellbore. The water quantities needed for well stimulation can range from 2 to 5 million gallons per well.

When a well begins producing, some of the water used during the stimulation begins to return to the surface. The first three months of production is called the flowback time, and is when the most water is returned to the surface with the oil and gas. After the flowback period, the flow of water returning to the surface slows, but continues. Over the life of the well, the amount of water that returns to the surface can range from as little as 10% to over 70% of the water used for the stimulation, or between 200,000 to 3.5 million gallons of water.

Flowback and produced waters present a challenge to oil and gas suppliers. The water is a resource that can be utilized for further fracturing, but the high levels of total dissolved solids and other contaminants necessitate some treatment or blending of the water before the water can be reused. Treatment of the water can range from simply addition of a biocide such as peracetic acid, to full blown clarification at a water treatment plant. The treatment method is based off of the water quality and desired end use for the water. Blending of produced waters with fresh water can lead to problems if the waters contain incompatible ions such as barium and sulfate, which can lead to scale formation. End water quality must also be considered when blending fresh and produced waters. An on-line water quality monitor would help with the treatment decisions for the water, and also with blending off of the produced water with compatible fresh water.

BRIEF SUMMARY OF THE INVENTION

A method of monitoring and controlling one or more properties of produced water is disclosed. The method comprises (a) providing a storage device; (b) introducing produced water into the storage device; (c) providing a monitoring and controlling unit comprising a controller and a plurality of sensors in communication with the controller, wherein each of the plurality of sensors is operable to measure a property of the produced water; (d) providing one or more pumps, which are in communication with the controller, wherein the one or more pumps can comprise one or more chemical injection pumps and one or more fresh water source pumps; (e) inputting an acceptable range for each of the one or more properties of the produced water to be measured into the controller; (f) providing a delivery conduit having a first end submerged in, or in fluid communication with, the produced water and a second end connected to an inlet of the monitoring and controlling unit; (g) pumping a sample of produced water from the storage device into the monitoring and controlling unit; (h) measuring one or more properties of the sample of produced water with the plurality of sensors; (i) determining if the measured one or more properties of the sample of produced water is within the acceptable range inputted into the controller in step (e); wherein (j) if the measured one or more properties is outside of the acceptable range associated with that property inputted in step (e), causing a change in an influx of a chemical into the produced water from the one or more chemical injection pumps, the chemical being capable of adjusting the measured property associated with the produced water in a manner to bring the measured property within the acceptable range, or causing a change in a flow rate of the one or more fresh water source pumps; and (k) optionally repeating steps (a) to (i) to determine if the one or more properties has been brought within the acceptable range inputted in step (e).

Also provided is a system for optimizing one or more properties of produced water. The system comprises (a) one or more sensors operable to measure a property associated with the produced water and convert the measured property into an input signal capable of being transmitted; (b) a transmitter associated with each of the one or more sensors operable to transmit the input signal; (c) a controller operable to receive the transmitted input signal, convert the received input signal into an input numerical value, analyze the input numerical value, determine if the analyzed value is within an acceptable range, generate an output numerical value based upon the analyzed value, convert the output numerical value into an output signal, and transmit the output signal; (d) a receiver operable to receive the output signal and cause a change in an influx rate of a chemical injected into the produced water by one or more chemical injection pumps if the output numerical signal is not within the acceptable range, wherein the chemical is capable of adjusting the measured property to come within the acceptable range for that property, or cause a change in a flow rate of one or more fresh water source pumps.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which:

FIG. 1 shows a schematic view showing various components of the presently disclosed system for measuring and optimizing one or more properties of produced water.

DETAILED DESCRIPTION OF THE INVENTION

This disclosure relates to systems, methods, and devices useful for monitoring and controlling water that was used in, for example, oil and natural gas production processes. Hereinafter, this water can be referred to as "produced water," meaning that it has been used in and/or come from a hydrocarbon production or recovery process, such as hydraulic fracturing. The systems, methods, and devices can be implemented anywhere where produced water is found, such as at a well head or at a produced water treatment plant.

The disclosure also describes an on-line unit for measuring, controlling, and/or optimizing the quality of produced water. The disclosure provides methods to measure, control, and/or optimize one or more system parameters or properties of produced water. Optimization can include measuring one or more properties associated with the produced water to be sure that the one or more properties are within an acceptable range and, if the one or more properties are not within the acceptable range for each respective property being measured, causing a change in flow of one or more water sources and/or one or more chemicals. In certain aspects, optimization or treatment can include blending the produced water with fresh water, adding certain chemicals to the produced water, or a combination thereof. Optimization or treatment of the produced water can also comprise full blowdown clarification at a water treatment plant. In any aspect, treatment and/or optimization procedures take into account the desired end use of the produced water.

In certain aspects, one of which is shown in FIG. 1, the system can include a monitoring and controlling unit that comprises a controller device (1) and a plurality of sensors (3). Each of the plurality of sensors (3) can be in communication with the controller. For example, if the unit comprises five sensors, each of the five sensors can be in communication with the controller. In certain aspects, the controller can be attached to a skid, or other type of support member. Further, the skid can be mounted inside of a mobile housing, such as a trailer. Thus, the monitoring and controlling unit can be mobile and moved around quite easily from site to site.

As used herein, the term "controller" or "controller device" refers to a manual operator or an electronic device having components such as a processor, memory device, digital storage medium, a communication interface including communication circuitry operable to support communications across any number of communication protocols and/or networks, a user interface (e.g., a graphical user interface that may include cathode ray tube, liquid crystal display, plasma display, touch screen, or other monitor), and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link, wired network (e.g., Ethernet) and the like. In addition, other components such as a signal conditioner or system monitor may be included to facilitate signal transmission and signal-processing algorithms.

In certain aspects, the controller includes hierarchy logic to prioritize any measured or predicted properties associated with system parameters. For example, the controller may be programmed to prioritize system pH over conductivity, or vice versa. It should be appreciated that the object of such hierarchy logic is to allow improved control over the system parameters and to avoid circular control loops.

In one aspect, the monitoring and controlling unit and method associated therewith includes an automated controller. In another aspect, the controller is manual or semimanual. For example, where the system includes one or more datasets received from various sensors in the system, the controller may either automatically determine which data points/datasets to further process or an operator may partially or fully make such a determination. A dataset for produced water, for instance, may include variables or system parameters such as ORP, DO, conductivity, pH, turbidity, concentrations of certain chemicals such as biocides, scale inhibitors, friction reducers, acids, bases, and/or oxygen scavengers, levels of ions (e.g., determined empirically, automatically, fluorescently, electrochemically, colorimetrically, measured directly, calculated), temperature, pressure, flow rate, total dissolved or suspended solids, etc. Such system parameters are typically measured with any type of suitable data capturing equipment, such as sensors designed specifically for these parameters, for example pH sensors, ion analyzers, temperature sensors, thermocouples, pressure sensors, corrosion probes, and/or any other suitable device or sensor. Data capturing equipment is in communication with the controller and, according to alternative embodiments, may have advanced functions (including any part of the control algorithms described herein) imparted by the controller.

Produced water can be separated from the hydrocarbons, such as oil or gas, using a separation device. The separated produced water can then be sent to, and stored in, for example, holding tanks. Any storage device similar to a holding tank that can be used to store produced water may be used in accordance with this disclosure. In certain aspects of the present disclosure, a sample of produced water can be drawn from one or more holding tanks and routed through the monitoring and controlling unit to take various measurements of the produced water. For example, a conduit can have a first end in fluid communication within a holding tank and a second end at an input location on the monitoring and controlling unit. The water can be pumped from the holding tank, through the conduit, and into the monitoring and controlling unit.

In certain aspects, two samples of produced water can be pumped into the monitoring and controlling unit. For example, there may be a first conduit running from a first holding tank into the monitoring and controlling unit and a second conduit running from a second holding tank into the monitoring and controlling unit. With this arrangement, samples of produced water from a first holding tank can be routed through, and analyzed by, the monitoring and controlling unit, while samples of other produced water, such as produced water from a second holding tank, can also be routed through, and analyzed by, the monitoring and controlling unit. It is also contemplated that in certain aspects, more than two samples of produced water could be analyzed by the monitoring and controlling unit. This would be accomplished by placing a conduit between the monitoring and controlling unit and each of a plurality of holding tanks. The monitoring and controlling unit would have separate inputs for each conduit and thus, each source of produced water could be analyzed separately to determine the proper blend of fresh water to be added or the proper dosage of certain chemicals to be added to each source of produced water, respectively.

The monitoring and controlling unit comprises a plurality of sensors, which are capable of analyzing the produced water samples and transmitting data regarding the samples to the controller. The plurality of sensors can comprise, for example, sensors for measuring conductivity, pH, oxidation/reduction potential (ORP), biocide concentration, turbidity, temperature, flow, and dissolved oxygen (DO) in the water. The monitoring and controlling unit can comprise any of these sensors, all of these sensors, or a combination of two or more of these sensors, and in all aspects of this disclosure, the sensors can be in communication with the controller. It is also contemplated that any other type of sensor that can provide a 4-20 mA output can be connected to, and in communication with, the controller. Other types of sensors contemplated by the present disclosure can include, but are not limited to, oil in water sensors, total dissolved solids sensors, and total suspended solids sensors.

After the sample of produced water is pumped from a holding tank and routed through the monitoring and controlling unit, a conduit is present that routes the water back to, for example, the particular holding tank or similar storage device from where it came, a different storage device, or to waste. The holding tanks and/or storage devices can be present at the site of the well or they can be located, for example, at a water treatment plant. Thus, in certain aspects, the controller or monitoring and controlling unit can have a delivery conduit (or two or more delivery conduits as previously described) for bringing produced water into the monitoring and controlling unit for analysis and it can also have one or more return conduits, which serve to return the analyzed water back to the holding tank or other storage device from which it came.

The presently disclosed monitoring and controlling system can also comprise, in certain aspects, one or more chemical injection pumps. These chemical injection pumps can be in fluid communication with the holding tank, or each holding tank if there is more than one holding tank. For example, one or more chemical injection pumps can be in fluid communication with a first holding tank and one or more chemical injection pumps can be in fluid communication with a second holding tank. In one aspect, there could be a conduit running from the chemical injection pump into the holding tank. If necessary, the chemical injection pump could then supply a chemical through the conduit and into the holding tank comprising the produced water. There can also be multiple chemical injection pumps and each pump can have a conduit running therefrom to the holding tank, or each holding tank if there is more than one holding tank comprising produced water. Each chemical injection pump can have a different chemical housed therein, so that based upon the measurements of the sample of produced water, one or more different chemicals could be added to the produced water in the holding tank to modify its properties. In other aspects, the chemical injection pumps do not need to comprise conduits for routing the chemical into the holding tank but instead may be located sufficiently close to the holding tank so that they can simply release chemicals into the holding tank in a manner similar to a faucet over a sink. In all aspects, the presently disclosed chemical injection pumps can be in communication with the controller, as will be described hereinafter in greater detail. Furthermore, in certain aspects, the chemical injection pumps can simply be used to inject fresh water into the holding tank.

The disclosed monitoring and controlling system provides methods to generate real-time, on-line, reliable data from produced water. As previously mentioned, the produced water can be stored in a storage device, such as a holding tank, and a sample thereof can be taken from the storage device, routed through a conduit, and injected into the monitoring and controlling unit, where it is analyzed by a plurality sensors. Based upon the data received by the controller from the plurality of sensors, adjustments can be made to the produced water in the storage device.

For example, when the monitoring and controlling system comprises one or more chemical injection pumps, these chemical injection pumps can be in communication with the controller in any number of ways, including as examples through any combination of wired connection, a wireless connection, electronically, cellularly, through infrared, satellite, or according to any other types of communication networks, topologies, protocols, standards and more. Accordingly, the controller can send signals to the pumps to control their chemical feed rates or fresh water feed rates.

In addition, multiple sources of produced water can be present on site. In certain aspects, produced water can be pumped through a first conduit from a first storage device and different produced water can be pumped through a second conduit from a different storage device. Each of the chemical injection pumps can be in communication with (e.g., electronically, cellularly, etc.), and regulated by, the controller. Different sources of produced water can be transported to a holding tank, where they are combined. In this aspect, a conduit can travel from an outlet in the holding tank to an inlet of the monitoring and controlling unit. Mixed produced waters exiting the holding tank can thus be pumped and injected into the monitoring and controlling unit. This water is then analyzed by the plurality of sensors and data regarding various water properties is generated. Based upon the data, optimization or treatment techniques can be applied to the mixture of produced waters. For example, if the sensors determine that the conductivity of the water sample from the holding tank is too high, then the controller can send a signal to increase the amount of fresh water being added to the produced water in the holding tank (i.e. signal the pump associated with the fresh water to increase its flow rate).

In an aspect, such as that shown in FIG. 1, the monitoring and controlling system is implemented to have the plurality of sensors (3) provide continuous or intermittent feedback, feedforward, or predictive information to the controller (1), which can relay this information to a relay device (2), such as the Nalco Global Gateway, which can transmit the information via cellular communications to a remote device, such as a cellular telephone, computer, or any other device that can receive cellular communications. This remote device can interpret the information and automatically send a signal (e.g. electronic instructions) back, through the relay device, to the controller to cause the controller to make certain adjustments to the output of the chemical injection pumps. The information can also be processed internally by the controller and the controller can automatically send signals to the pumps, to adjust the amount of chemical injection, or to the pumps responsible for the flow rate of one or more fresh water sources. Based upon the information received by the controller from the plurality of sensors or from the remote device, the controller can transmit signals to the various pumps to make automatic, real-time adjustments, to the amount of chemical that the pumps are injecting into the produced water storage device or the amount of one or more sources of fresh water being added to the produced water in the storage device.

Alternatively, an operator of the remote device that receives cellular communications from the controller can manually manipulate the pumps through the remote device. The operator can communicate instructions, through the remote device, cellularly or otherwise, to the controller and the controller can make adjustments to the rate of chemical addition of the chemical injection pumps or the flow rate of a pump associated with a particular source of fresh water. For example, the operator can receive a signal or alarm from the remote device through a cellular communication from the controller and send instructions or a signal back to the controller using the remote device to turn on one or more of the chemical injection pumps, turn off one or more of the chemical injection pumps, increase or decrease the amount of chemical being added to the produced water by one or more of the injection pumps, increase or decrease the amount of fresh water being added to the produced water, or any combination of the foregoing. The controller and/or the remote device is also capable of making any of the foregoing adjustments or modifications automatically without the operator actually sending or inputting any instructions. This capability can be because preset parameters or programs can be inputted into the controller or remote device so that the controller or remote device can determine if a measured property is outside of an acceptable range and based on the information received by the plurality of sensors, the controller or remote device can make appropriate adjustments to the pumps or send out an appropriate alert because it has been programmed to do so.

In certain aspects, the remote device or controller can include appropriate software to receive data from the plurality of sensors and determine if the data indicates that one or more measured properties of the water are within, or outside, an acceptable range. The software can also allow the controller or remote device to determine appropriate actions that should be taken to remedy the property that is outside of the acceptable range. For example, if the measured conductivity is above the acceptable range, the software allows the controller or remote device to make this determination and take remedial action, such as alerting a pump to increase the flow of fresh water going into the holding tank.

The monitoring and controlling system and/or controller disclosed herein can incorporate programming logic to convert analyzer signals from the plurality of sensors to pump adjustment logic and, in certain embodiments, control one or more of a plurality of chemical injection pumps, or fresh water source pumps, with a unique basis. Non-limiting, illustrative examples of the types of chemical injection pumps that can be manipulated include chemical injection pumps responsible for injecting biocides, scale inhibitors, friction reducers, acids, bases, sulfites, oxygen scavengers, and any other type of chemical that could prove to be useful. Particular examples of biocides, scale inhibitors, friction reducers, acids, bases, sulfites, and oxygen scavengers are all well-known in the art and all examples of such chemicals are contemplated to be within the scope of the present disclosure.

For example, in certain aspects, the biocide can be a member selected from the group consisting of peracetic acid, peroxide, bleach, glutaraldehyde, quaternary amines, and any combination thereof. The oxygen scavenger can be a sulfite, the acid can be hydrochloric acid (HCl), and the base can be sodium hydroxide (NaOH).

The presently disclosed controller can manage and interpret readings of the water from the sensors, such as biocide concentration, dissolved oxygen (DO) content, conductivity, total dissolved solids (TDS), pH, oxidation/reduction potential (ORP), turbidity, temperature, flow, oil in water, and total suspended solids. Sensors for all of these properties can be incorporated into the monitoring and controlling unit or sensors for any combination of these properties can be incorporated into the monitoring and controlling unit. For example, in certain aspects, the monitoring and controlling unit can include pH, conductivity, flow, temperature, and turbidity sensors. The pH sensor can measure the pH of the water sample, the conductivity sensor can measure the conductivity of the water sample, the flow sensor can monitor the flow of sample water through the unit to be sure that sample water is actually flowing therethrough, the temperature sensor can measure the temperature of the water, and the turbidity sensor can measure scattered light of the water wherein if the scattered light through the water sample is high, the water is impure, and could be, for example, too muddy.

Sensors for monitoring biocide concentration, ORP, DO, total dissolved solids, total suspended solids, corrosion, oil in water, etc., can also be included in the monitoring and controlling unit in any combination. The monitoring and controlling unit can include any combination of the sensors disclosed herein, and any other sensor capable of providing a 4-20 mA output. The readings from these sensors can be sent to and programmed through the controller, which can be, for example, a Programming Logic Controller (PLC), to possibly override or modify the chemical injection pump rates and/or the fresh water source chemical injection pumps.

In an aspect, the disclosure provides a method for monitoring, controlling, treating, and/or optimizing one or more properties of produced water. A property, such as conductivity, pH, turbidity, etc., of the sample of produced water is measured and/or predicted, and is subsequently converted into an input signal, such as an electrical input signal, capable of being transmitted from a sensor to the controller. In turn, the controller is operable to receive the transmitted input signal, convert the received signal into an input numerical value, analyze the input numerical value, generate an output numerical value, convert the output numerical value into an output signal, and transmit the output signal to, for example, the remote communication device or one or more of the chemical injection pumps or fresh water source pumps.

For example, an optimum conductivity range, pH range, biocide concentration range, dissolved oxygen range, etc., for the input numerical value can be determined and/or preselected and if the measured input numerical value for the specific property is outside of the optimum range, the transmitted output signal to the chemical injection pump or fresh water source pump causes a change in an influx of a chemical into the produced water in the storage device via the chemical pumps or causes a change in the flow rate of the fresh water source chemical injection pump. The chemical is capable of adjusting the property associated with the system parameter in a manner to bring the input numerical value within the optimum or acceptable range. Similarly, regulation of the flow rate of one or more fresh water source pumps is capable of adjusting the measured property in a manner to bring its input numerical value within the optimum or acceptable range. The foregoing process can be run initially on a sample of the produced water from the storage device and, if adjustments need to be made to the water based upon the initial input numerical value, the adjustments can be made to the various pumps and thereafter, the process can be conducted again to determine if the property of the produced water has been brought within the optimum or acceptable range.

The method is optionally repeated for a plurality of different system parameters, where each different system parameter has a unique associated property, or, alternatively, all system parameters can be analyzed concurrently by the plurality of sensors.

In certain aspects, as previously mentioned, the software associated with the controller or remote device can include acceptable parameters for various water properties or these acceptable parameters can be programmed into the controller or remote device, so that the controller or remote device will know if a particular measured property is within, or outside, an acceptable range.

With respect to pH, an acceptable range could be between about 5-10. In certain aspects, the acceptable range could be between about 6 and about 9. In other aspects, the acceptable range could be between about 7 and about 8. With respect to DO, an acceptable range could be less than 5 ppm. In other aspects, the acceptable range could be less than 1 ppm. With respect to conductivity, an acceptable range could be less than 100,000 µS. In other aspects, an acceptable range could be less than 70,000 µS. In certain embodiments, the acceptable range could be less than 30,000 µS. With respect to residual biocide, the acceptable range could be less than 50 ppm. In other aspects, the acceptable range could be less than 20 ppm. In certain aspects, the acceptable range could be less than 10 ppm. Also, with respect to total suspended solids, the acceptable range could be less than 100 ppm. In other aspects, the acceptable range could be less than 50 ppm. In certain aspects, the acceptable range could be less than 10 ppm.

In any event, the controller and/or remote device can determine if any of the measured properties are outside of their acceptable range and the controller or remote device can make automatic remedial adjustments to bring this property of the water within the acceptable range. For example, if the measured conductivity is above 100,000 µS, the controller or remote device can send a signal to a fresh water source injection pump to increase the flow of fresh water into the holding tank to lower the conductivity to within the acceptable range. As an additional illustrative example, if the measured pH of the produced water is below 5, the controller or remote device can send a signal to a chemical injection pump to add a base to the produced water in the storage device (e.g. holding tank) to increase the pH of the produced water and bring it within the acceptable range.

As noted herein, the monitoring and controlling unit comprises a plurality of sensors operable to sense and/or predict a property associated with the water or system parameter and convert the property into an input signal, e.g., an electric signal, capable of being transmitted to the controller. A transmitter associated with each sensor transmits the input signal to the controller. The controller is operable to receive the transmitted input signal, convert the received input signal into an input numerical value, analyze the input numerical value to determine if the input numerical value is within an optimum or acceptable range, generate an output numerical value, convert the output numerical value into an output signal, e.g., an electrical signal, and transmit the output signal to a receiver, such as a pump incorporating such receiver capabilities or a remote device, such as a computer or cellular telephone, incorporating receiver capabilities. The receiver receives the output signal and either alerts an operator to make adjustments to flow rates of the pumps, or the receiver can be operable to cause a change in a flow rate of the pumps automatically, if the output numerical value is not within the acceptable range for that property.

A produced water control program can include components such as neutralizing chemicals, biocides, corrosion inhibitors, acids, bases, scale inhibitors, oxygen scavengers, friction reducers, etc. Such chemicals have been traditionally injected into the produced water based upon measurements derived from grab samples of the produced water that were analyzed in a lab. However, these types of measurements can lead to overdosing or under-dosing certain chemicals to the water, or introducing too much/too little fresh water into the produced water, because a significant amount of time can lapse between taking the initial sample, bringing the sample to the lab for analysis, and returning to treat the produced water. During this time period, the chemistry of the produced water in the storage device can be changed, either intentionally by adding more produced water or naturally, and thus, the water tested in the laboratory will not be indicative of the water in the storage device. To overcome such problems, the present disclosure provides a mobile, on-line, real-time, automated method of monitoring the produced water and controlling its properties by chemical injection or flow regulation, without the need to measure water quality of the produced water in a laboratory or other testing facility involving grab sampling techniques.

Data transmission of measured parameters or signals to chemical pumps, fresh water source pumps, alarms, remote monitoring devices such as computers or cellular telephones, or other system components is accomplished using any suitable device, and across any number of wired and/or wireless networks, including as examples, WiFi, WiMAX, Ethernet, cable, digital subscriber line, Bluetooth, cellular technologies (e.g., 2G, 3G, Universal Mobile Telecommunications System (UMTS), GSM, Long Term Evolution (LTE), or more) etc. The Nalco Global Gateway is an example of a suitable device. Any suitable interface standard(s), such as an Ethernet interface, wireless interface (e.g., IEEE 802.11a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., archiving systems, data analysis stations, data capturing devices, process devices, remote monitoring devices, chemical injection pumps, etc.) may be connected to one another using the above-described or other suitable interface or connection.

In an embodiment, system parameter information is received from the system and archived. In another embodiment, system parameter information is processed according to a timetable or schedule. In a further embodiment, system parameter information is immediately processed in real-time or substantially real-time. Such real-time reception may include, for example, "streaming data" over a computer network.

In certain embodiments, multiple produced water or system parameters, or other constituents present in the produced water, could be measured and/or analyzed. Representative measured parameters or constituents include chloride ion, strong or weak acids such as sulfuric, sulfurous, thiosulfurous, carbon dioxide, hydrogen sulfide, and organic acids, ammonia, various amines, and liquid or solid deposits. Various methods of measuring such parameters are contemplated and this disclosure is not limited to any particular method. Representative methods include, but are not limited to, those disclosed in U.S. Pat. No. 5,326,482, titled "On-Line Acid Monitor and Neutralizer Feed Control of the Overhead Water in Oil Refineries"; U.S. Pat. No. 5,324,665, titled "On-Line Method for Monitoring Chloride Levels in a Fluid Stream"; U.S. Pat. No. 5,302,253, titled "On-Line Acid Monitor and Neutralizer Feed Control of the Overhead Water in Oil Refineries," each of which is incorporated herein by reference in its entirety.

The chemicals to be added to the system or produced water, such as the acids, bases, biocides, scale inhibitors, friction reducers, etc., may be introduced to the system or produced waters using any suitable type of chemical injection pump. Most commonly, positive displacement injection pumps are used and are powered either electrically or pneumatically. Continuous flow injection pumps can also be used to ensure specialty chemicals are adequately and accurately injected into the rapidly moving process stream. Though any suitable pump or delivery system may be used, exemplary pumps and pumping methods include those disclosed in U.S. Pat. No. 5,066,199, titled "Method for Injecting Treatment Chemicals Using a Constant Flow Positive Displacement Pumping Apparatus" and U.S. Pat. No. 5,195,879, titled "Improved Method for Injecting Treatment Chemicals Using a Constant Flow Positive Displacement Pumping Apparatus," each incorporated herein by reference in its entirety.

The chemicals or fresh water to be added to the produced water can be added to the produced water at any point after the produced water is recovered from the hydrocarbon production process. For example, the chemicals or fresh water can be added into one or more holding tanks or other types of storage devices, the chemicals may be added into the fresh water storage device, or the chemicals or fresh water can be added into any conduit that is involved in the transportation of the produced water.

It should be appreciated that a suitable, acceptable, or optimal range for a particular parameter or property should be determined for each individual system or each individual body of produced water. The optimum or acceptable range for one system or body of water may vary considerably from that for another system or body of water. It is within the concept of this disclosure to cover any possible acceptable or optimum ranges for the contemplated system parameters or properties.

In some embodiments, changes in the chemical injection pumps are limited in frequency. In some aspects, adjustment limits are set at a maximum of 1 per 15 min and sequential adjustments in the same direction may not exceed 8, for example. In some embodiments, after 8 total adjustments or a change of 50% or 100%, the pump could be suspended for an amount of time (e.g., 2 or 4 hours) and alarm could be triggered. If such a situation is encountered, it is advantageous to trigger an alarm to alert an operator. Other limits, such as maximum pump output may also be implemented. It should be appreciated that it is within the scope of this disclosure to cause any number of adjustments in any direction without limitation. Such limits are applied as determined by the operator or as preset into the controller.

In accordance with an aspect of the present disclosure, a method of monitoring and controlling one or more properties of produced water is provided. One or more properties means that the method can control or monitor one property of the produced water, two properties of the produced water, three, four, five, six, or more, properties of the produced water. As previously mentioned, the properties can be pH, conductivity, turbidity, flow, temperature, etc.

The method can comprise the step of (a) providing a storage device for the produced water. In certain aspects, more than one storage device can be provided, such as two storage devices or three storage devices. For example, the storage device can be a holding tank.

The method can also comprise the step of (b) introducing produced water into the storage device (or storage devices). Moreover, the method includes the step of (c) providing a monitoring and controlling unit comprising a controller and a plurality of sensors in communication with the controller, wherein each of the plurality of sensors is operable to measure a property of the produced water. For example, in one aspect, the unit can comprise five sensors, wherein each sensor is operable to measure a different property, such as pH, temperature, flow, conductivity, and turbidity.

The method can further include the step of (d) providing one or more pumps, which are in communication with the controller, wherein the one or more pumps can comprise one or more chemical injection pumps and one or more fresh water source pumps. For example, a chemical injection pump can be provided that is operable to inject a biocide into the produced water, a chemical injection pump can be provided that is operable to inject an oxygen scavenger into the produced water, a chemical injection pump can be provided that is operable to inject an acid into the produced water, a chemical injection pump can be provided that is operable to inject a base into the produced water, and/or a chemical injection pump can be provided that is operable to inject a sulfite into the produced water. Moreover, if the method includes more than one storage device for the produced water, then each storage device can be in fluid communication with one or more pumps. Illustratively, if the method includes a first storage device and a second storage device, then one or more pumps can be provided and associated with each storage device.

The method can also comprise the step of (e) inputting an acceptable range for each of the one or more properties of the produced water to be measured into the controller. As previously noted, with respect to the property of pH, an operator could input an acceptable range of 5-10 into the controller, for example.

The method can also comprise the step of (f) providing a delivery conduit having a first end submerged in, or in fluid communication with, the produced water, and a second end connected to an inlet of the monitoring and controlling unit. However, if more than one storage device is provided, for example, two storage devices or three storage devices, then the method can comprise the step of providing two delivery conduits or three delivery conduits, each delivery conduit running from a respective storage device and having a respective inlet on the monitoring and controlling unit.

The method can also comprise the step of (g) pumping a sample of produced water from
the storage device(s) into the monitoring and controlling unit and (h) measuring one or more properties of the sample of produced water with the plurality of sensors.

Further, the method can comprise the step of (i) determining if the measured one or more properties of the sample of produced water is within the acceptable range inputted into the controller in step (e). This determining step can be automatically performed by the controller and in this step, the measured value for each measured property is compared to the acceptable range inputted for that specific property.

The method can also comprise the step (j) wherein if the measured one or more properties is outside of the acceptable range associated with that property inputted in step (e), causing a change in an influx of a chemical into the produced water from the one or more chemical injection pumps, the chemical being capable of adjusting the measured property associated with the produced water in a manner to bring the measured property within the acceptable range and/or causing a change in a flow rate of the one or more fresh water source pumps. For example, if the measured property of pH is higher than 10, then a chemical injection pump can be signaled and caused to inject an acid into the produced water, to bring the pH within the acceptable range of 5-10. As an additional example, if the measured property of conductivity (or turbidity) is higher than the upper limit of the acceptable range, then a fresh water source pump can be signaled and caused to increase the flow rate of the fresh water source to lower the conductivity (or turbidity) of the produced water stored in the storage device. Moreover, if the measured conductivity is higher, or at the higher end of the acceptable range, then a chemical injection pump could be signaled and caused to inject a greater amount of biocide into the produced water.

The method can also include step (k) wherein steps (a) to (i) are optionally repeated to determine if the one or more properties has been brought within the acceptable range inputted in step (e). If each measured property has been brought within the acceptable range for that measured property after step (i), (j), or (k), then the produced water or blend of produced waters is suitable for its intended purpose, whatever that may be. As an example, an intended purpose could be to re-use the water in a hydrocarbon recovery process. However, if one or more measured properties are substantially outside of the inputted acceptable ranges for those properties, and it would require a large amount of time or resources to bring the one or more properties within the acceptable range for that property, then that body of produced water can simply be diverted to waste.

Certain aspects of the presently disclosed methods and monitoring and controlling systems have been uniquely developed. For example, the monitoring and controlling unit can be mobile. Mobility of this unit provides numerous benefits over the pre-existing stationary devices. Also, due to the extraordinary nature of the produced water, various sensors used in connection with the present disclosure were modified in a manner such that they would be useful in connection with the produced water. As an example, the conductivity sensor had to be experimentally tested and modified such that it could measure significantly higher conductivities than the prior art conductivity sensors. Where the prior art conductivity sensors used to monitor and control various waters associated with industrial aqueous systems may have been able to measure conductivities up to about 20,000 microsiemens ($\mu S$), the presently disclosed conductivity sensors can measure conductivity up to about 2 million $\mu S$.

For example, a sensor used in connection with the present disclosure can measure conductivity in a range of about 250 $\mu S$ to about 2 million $\mu S$, or any subrange thereof. In certain aspects, a sensor used in connection with the present disclosure can measure conductivity in a range of about 25,000 $\mu S$ to about 2 million $\mu S$, or any subrange thereof, such as from about 30,000 $\mu S$ to about 2 million $\mu S$, from about 30,000 $\mu S$ to about 1 million $\mu S$, from about 30,000 $\mu S$ to about 500,000 $\mu S$, from about 50,000 $\mu S$ to about 2 million $\mu S$, or from about 70,000 $\mu S$ to about 2 million $\mu S$. Again, any range between about 250 $\mu S$ and about 2 million $\mu S$ is contemplated and capable of being measured by the conductivity sensors used in connection with the present disclosure.

As previously noted, produced water is unique when compared to many other types of water used in other aqueous industrial systems because it has a very high total dissolved solids (TDS) content. Moreover, the produced water could include oil and thus have a high suspended solids content. High TDS and suspended solid properties of the produced water can lead to an increase in the conductivity of the water and thus, incorporating sensors into the controller or system that can measure extraordinarily high conductivities can be useful or essential in some cases.

This disclosure will help dose optimum levels of chemicals during the treatment process. The disclosure will also help identify the composition of produced waters. So that proper, real-time adjustments can be made, or decisions can be made as to how to use the produced water going forward, such as sending it to waste or reusing it in a hydrocarbon recovery or production process.

All of the compositions, systems, and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

The systems, devices, and logic described above, such as the controller, can be implement in many different ways in many different combinations of hardware, software, or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the controller may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of monitoring and controlling one or more properties of produced water comprising:
    (a) providing a storage device;
    (b) introducing produced water into the storage device before measuring one or more properties of the produced water;
    (c) providing a monitoring and controlling unit comprising a controller and a plurality of sensors in communication with the controller, wherein each of the plurality of sensors is operable to measure a property of the produced water;
    (d) providing one or more pumps, which are in communication with the controller, wherein the one or more pumps can comprise one or more chemical injection pumps and one or more fresh water source pumps;
    (e) inputting an acceptable range for each of the one or more properties of the produced water to be measured into the controller;
    (f) providing a delivery conduit having a first end in fluid communication with the produced water and a second end connected to an inlet of the monitoring and controlling unit;
    (g) pumping a sample of produced water from the storage device directly into the monitoring and controlling unit;
    (h) measuring one or more properties of the sample of produced water with the plurality of sensors;
    (i) determining if the measured one or more properties of the sample of produced water is within the acceptable range inputted into the controller in step (e); wherein
    (j) if the measured one or more properties is outside of the acceptable range associated with that property inputted in step (e), causing a change in an influx of a chemical into the produced water from the one or more chemical injection pumps, the chemical being capable of adjusting the measured property associated with the produced water in a manner to bring the measured property within the acceptable range, or causing a change in a flow rate of the one or more fresh water source pumps;
    (k) pumping the sample of produced water from the monitoring and controlling unit directly back into the storage device; and
    (l) optionally repeating steps (a) to (i) to determine if the one or more properties has been brought within the acceptable range inputted in step (e).

2. The method of claim 1, including: (i) converting the measured property into an input signal capable of being transmitted to the controller and (ii) transmitting the input signal to the controller.

3. The method of claim 2, including transmitting the input signal via a wireless interface.

4. The method of claim 2, wherein the controller is operable to: (i) receive the transmitted input signal; (ii) convert the received signal into an input numerical value; (iii) analyze the input numerical value: (iv) generate an output numerical value; (v) convert the output numerical value into an output signal; and (vi) transmit the output signal.

5. The method of claim 4, including transmitting the output signal via a wireless interface.

6. The method of claim 4, wherein the controller is operable to: (i) analyze the input numerical value and (ii) determine if the input numerical value corresponds to the acceptable range associated with the measured property.

7. The method of claim 6, wherein if the input numerical value does not correspond to the acceptable range, the transmitted output electrical signal causes a change in the influx of the chemical into the produced water, the chemical being capable of adjusting the property in a manner to cause the input numerical value to correspond to the acceptable range associated with that property, or causing a change in a flow rate of the one or more fresh water source pumps.

8. The method of claim 1, including continuously or intermittently measuring the one or more properties of the produced water.

9. The method of claim 1, including monitoring the one or more properties in real time.

10. The method of claim 1, wherein the one or more chemicals are selected from the group consisting of biocides, scale inhibitors, corrosion inhibitors, friction reducers, acids, bases, sulfites, and oxygen scavengers.

11. The method of claim 1, wherein the one or more sensors are operable to measure properties of the produced water selected from the group consisting of conductivity, pH, oxidation/reduction potential, biocide concentration, turbidity, temperature, flow, dissolved oxygen, total suspended solids, and total dissolved solids.

12. A method of monitoring and controlling one or more properties of produced water comprising:
    (a) providing a storage device;
    (b) introducing produced water into the storage device;
    (c) providing a monitoring and controlling unit comprising a controller and a plurality of sensors in communication with the controller, wherein the plurality of sensors is operable to measure properties of the produced water selected from the group consisting of conductivity, pH, oxidation/reduction potential, biocide concentration, turbidity, temperature, flow, dissolved oxygen, total suspended solids, and total dissolved solids, one sensor operable to measure the conductivity of the produced water, the sensor operable to measure the conductivity of the produced water can measure conductivities from about 25,000 µS to about 2 million µS;
    (d) providing one or more pumps, which are in communication with the controller, wherein the one or more pumps can comprise one or more chemical injection pumps and one or more produced water source pumps;
    (e) inputting an acceptable range for each of the one or more properties of the produced water to be measured into the controller;

(f) providing a delivery conduit having a first end submerged in the produced water and a second end connected to an inlet of the monitoring and controlling unit;

(g) pumping a sample of produced water from the storage device into the monitoring and controlling unit;

(h) measuring one or more properties of the sample of produced water with the plurality of sensors;

(i) determining if the measured one or more properties of the sample of produced water is within the acceptable range inputted into the controller in step (e); wherein (j) when the measured one or more properties is outside of the acceptable range associated with that property inputted in step (e), causing a change in an influx of a chemical into the produced water from the one or more chemical injection pumps, the chemical being capable of adjusting the measured property associated with the produced water in a manner to bring the measured property within the acceptable range, or causing a change in a flow rate of the one or more produced water source pumps; and (k) optionally repeating steps (a) to (i) to determine if the one or more properties has been brought within the acceptable range inputted in step (e).

13. The method of claim 1, including operating the method continuously, automatically, and online, or on a batch basis.

14. The method of claim 1, wherein the monitoring and controlling unit is mobile.

15. The method of claim 1, including operating the method over a network.

16. A digital storage medium having computer-executable instructions stored thereon, the instructions operable to execute the method of claim 1.

17. A system for optimizing one or more properties of produced water, the system comprising:

(a) one or more sensors operable to measure a property associated with the produced water and convert the measured property into an input signal capable of being transmitted, the produced water being in a storage device before being measured by the one or more sensors, the produced water being returned directly to the storage device after being measured by the one or more sensors;

(b) a transmitter associated with each of the one or more sensors operable to transmit the input signal;

(c) a controller operable to receive the transmitted input signal, convert the received input signal into an input numerical value, analyze the input numerical value, determine if the analyzed value is within an acceptable range, generate an output numerical value based upon the analyzed value, convert the output numerical value into an output signal, and transmit the output signal;

(d) a receiver operable to receive the output signal and cause a change in an influx rate of a chemical injected into the produced water by one or more chemical injection pumps if the output numerical signal is not within the acceptable range, wherein the chemical is capable of adjusting the measured property to come within the acceptable range for that property, or cause a change in a flow rate of one or more fresh water source pumps.

18. The system of claim 17, wherein said one or more sensors and controller are mobile.

19. The system of claim 17, wherein the one or more chemical injection pumps, the one or more fresh water source pumps, a computer, or a cellular device comprises the receiver.

20. The system of claim 17, wherein said one or more sensors comprises a sensor for measuring conductivity of the produced water, wherein said conductivity sensor can measure conductivities from about 25,000 $\mu$S to about 2 million $\mu$S.

* * * * *